United States Patent Office 3,732,267
Patented May 8, 1973

3,732,267
14-PHENYL-9,12-DIOXO-11-HYDROXYTETRADEC-13-ENOIC ACID AND SALT THEREOF
Masateru Miyano, Morton Grove, Ill., assignor to
G. D. Searle & Co., Chicago, Ill.
No Drawing. Continuation-in-part of application Ser. No. 799,965, Feb. 17, 1969. This application Oct. 7, 1971, Ser. No. 187,568
Int. Cl. C07c 65/20; C08h 17/36
U.S. Cl. 260—413                    3 Claims

ABSTRACT OF THE DISCLOSURE

The condensation of dimethyl 3-oxoundecane-1,11-dioate with styrylglyoxal affords 14-phenyl-9,12-dioxo-11-hydroxytetradec-13-enoic acid. The instant compounds are useful as intermediates to prostanoic acid derivatives which exhibit anti-microbial, pepsin-inhibitory, hypotensive and smooth muscle-contracting properties.

---

This application is a continuation-in-part of my copending application Ser. No. 799,965 filed Feb. 17, 1969, now abandoned.

The present invention is concerned with derivatives of tetradecanoic acid and, more particularly, with 14-phenyl-9,12-dioxo-11-hydroxytetradec-13-enoic acid and its corresponding alkali metal salts. The instant compounds of the following structural formula

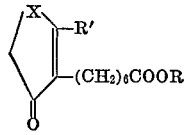

wherein R can be hydrogen or a lower alkyl radical, R' is a formyl, styryl or $\alpha,\beta$-dihydroxyphenethyl radical and X is a carbonyl, hydroxymethylene, (lower alkanoyl)oxymethylene or chloro(lower alkanoyl)oxymethylene radical.

The lower alkyl radicals represented by R are typified by methyl, ethyl, propyl, butyl, pentyl, hexyl, heptyl and the branched-chain groups isomeric therewith.

Illustrative of the lower alkanoyl radicals encompassed by the X term are formyl, acetyl, propionyl, butyryl, vareryl, caproyl, heptanoyl and the corresponding branched-chain isomers.

Those compounds are useful as pharmacological agents by virtue of their anti-microbial and hypotensive activity. They are also intermediates in the production of prostanoic acid derivatives.

Starting materials suitable for the manufacture of the compounds of this invention are styrylglyoxal, conveniently prepared by the selenous acid oxidation of 4-phenyl-3-buten-2-one, and the dialkyl esters of 3-oxo-undecane-1,11-dioic acid. Saponification of the dialkyl esters of 3-oxoundecane-1,11-dioic acid with an alkali metal hydroxide, such as potassium, sodium or lithium hydroxide, followed by subsequent reaction with styrylglyoxal affords the alkali metal salts of 14-phenyl-9,12-dioxo-11-hydroxytetradec-13-enoic acid. Acidification of those salts with acid, such as oxalic, citric or hydrochloric acid, then yields the free acid, 14-phenyl-9,12-dioxo-11-hydroxytetradec-13-enoic acid. For example, dimethyl 3-oxoundecane-1,11-dioate is thus saponified with potassium hydroxide and the resulting product is allowed to react with styrylglyoxal, thus affording the instant half potassium salt of 14-phenyl-9,12-dioxo-11 - hydroxytetradec - 13 - enoic acid. Acidification of that salt with dilute hydrochloric acid yields 14 - phenyl - 9,12 - dioxo - 11 - hydroxytetradec-13-enoic acid.

Cyclization of 14 - phenyl - 9,12 - dioxo-11-hydroxytetradec-13-enoic acid in the presence of potassium hydroxide results in 3 - hydroxy - 5 - oxo - 2 - styrylcyclopent-1-eneheptanoic acid. The 2 - ($\alpha,\beta$ - dihydroxyphenethyl) derivatives are readily obtained by hydroxylation of the corresponding 2-styryl compounds. A convenient reagent is osmium tetroxide. Methyl 3 - acetoxy - 5 - oxo-2 - styrylcyclopent - 1 - ene - heptanoate is thus contacted at room temperature with osmium tetroxide in dioxane to produce methyl 3 - acetoxy - 5 - oxo - 2 - ($\alpha,\beta$-dihydroxyphenethyl)cyclopent-1-eneheptanoate.

A convenient procedure for the manufacture of the 2-formyl compounds consists of cleaving the glycol structure of the corresponding 2-($\alpha,\beta$-dihydroxyphenethyl) substances. 3 - acetoxy - 5 - oxo - 2 - ($\alpha,\beta$ - dihydroxyphenethyl)cyclopent-1-eneheptanoate in ethanol is contacted with aqueous sodium periodate, thus affording 3-acetoxy - 2 - formyl - 5 - oxocyclopent - 1 - eneheptanoate. The 2-formyl compounds are alternatively produced from the corresponding 2-styryl derivatives by combining the hydroxylation and cleavage processes. Methyl 3-hydroxy-5 - oxo - 2 - styrylcyclopent - 1 - eneheptanoate in aqueous dioxane is thus allowed to react with osmium tetroxide and sodium periodate to afford methyl 2-formyl-3-hydroxy-5-oxocyclopent-1-eneheptanoate.

Oxidation of the 3-hydroxy compounds results in the corresponding 3,5-dioxo substances. Chromium trioxide in pyridine thus converts methyl 3 - hydroxy - 5 - oxo - 2-styrylcyclopent - 1 - eneheptanoate to methyl 3,5 - dioxo-2-styrylcyclopent-1-eneheptanoate.

The compounds produced by using the instant compounds of this invention as intermediates exhibit valuable pharmacological properties. They are anti-microbial agents as is evidenced by their anti-bacterial properties, in particular against *Diplococcus pneumoniae*, and their anti-protozoal activity, e.g. against *Trichromonas vaginalis* and *Tetrahymena pyriformis*. In addition, they are hypotensive agents.

The anti-bacterial property of the above compounds is specifically illustrated by the activity of 3-hydroxy-5-oxo-2-styrylcyclopent-1-eneheptanoic acid, methyl 3-acetoxy-2-($\alpha,\beta$ - dihydroxyphenethyl) - 5 - oxocyclopent-1-ene-heptanoate and methyl 2 - ($\alpha,\beta$ - dihydroxyphenethyl)-3,5 - dioxo - cyclopent - 1 - eneheptanoate when tested in the following assay:

Sterile blood agar is inoculated with a 24 hour broth culture of the bacterium, *Diplococcus pneumoniae*, whereupon approximately 5 mg. of the test compound is placed on the inoculated agar surface. The agar is then incubated at 37° C. for 24 hours, at the end of which time it is observed for zones of inhibition in the area immediately surrounding the test compound. Compounds which are effective in causing a zone of inhibition are designated active.

The anti-protozoal property of the above compounds is evidenced by the activity of methyl 3,5-dioxo-2-styrylcyclopent-1-eneheptanoate, 3-hydroxy-5-oxo-2-styrylcyclopent-1-eneheptanoic acid and methyl 3-acetoxy-2-($\alpha,\beta$-dihydroxyphenethyl)-5-oxocyclopent-1-eneheptanoate when assayed as follows:

To 80 volumes of a modified Diamond medium prepared by mixing 1200 parts of trypticase (Baltimore Biological Laboratories), 600 parts of yeast extract (Difco), 300 parts of maltose, 60 parts of L-cysteine hydrochloride, 12 parts of L-ascorbic acid, 48 parts of dibasic potassium phosphate, 48 parts of monobasic potassium phosphate and 54,000 parts of distilled water, adjusting the pH to 6.8 with 4% aqueous sodium hydroxide, incorporating 30 parts of agar (Baltimore Biological Laboratories), boiling for 1 minute to dissolve the agar, and sterilizing in an autoclave, is added aseptically 20 volumes of sterile Dubos medium serum. The resulting medium is inoculated with 1% by volume of a 72 hour culture of *Trichomonas vaginalis*, whereupon 1 ml. of the inoculated medium is mixed with 10 mg. of test compound. The mixture is incubated anaerobically at 37° C. for 48 hours, then is examined microscopically for the presence of motile trichomonads. If any are observed, the compound is considered inactive. If no motile trichomonads are observed, 0.1 ml. of the incubated mixture is serially diluted and mixed with additional quantities of the inoculated medium sufficient to produce concentrations of 1000, 100, 10 and 1 mcg. of test compound per ml. and the resulting mixtures are inoculated anaerobically as before at 37° C. for 48 hours, then are examined microscopically for the presence of motile trichomonads. Controls are provided by concurrent incubations identical with the foregoing except for the absence of the test compound.

Further evidence for the anti-protozoal activity of the compounds produced by employing the instant compounds of this invention is provided by the following assay, wherein 3-hydroxy-5-oxo-2-styrylcyclopent-1-ene-heptanoic acid and 2-formyl-3-hydroxy-5-oxocyclopent-1-ene-heptanoic acid, for example, have been found active:

A solution is prepared from 24 g. of proteose peptone, 16 g. of sucrose and 1000 ml. of distilled water. 0.5 ml. of this solution is inoculated with 10% by volume of a 4–7 day old culture of *Tetrahymena pyriformis* and the resulting mixture is added to 0.5 ml. of a solution or suspension containing 2 mg. of test compound per ml. of solution. The resulting mixture is incubated at room temperature for 48 hours, then examined microscopically for the presence of motile protozoa. If any are observed, the compound is considered inactive. If no motile protozoa are observed, 0.1 ml. of the incubated mixture is serially diluted and mixed with additional quantities of the inoculated medium sufficient to produce concentrations of 1000, 100, 10 and 1 mcg. of the test compound per ml. and the resulting mixtures are incubated as before at room temperature for 48 hours, then are examined microscopically for the presence of motile protozoa. Controls are provided by concurrent incubations identical with the foregoing except for the absence of the test compound.

The hypotensive property is exemplified by the activity of methyl 3,5-dioxo-2-styrylcyclopent-1-eneheptanoate and 3-hydroxy-5-oxo - 2 - styrylcyclopent-1-eneheptanoic acid when tested as follows:

This assay is substantially that described by Pickens et al., Circ. Res., 17, 438 (1965). Male Charles River rats weighing 100–350 g. are used. Each animal is anesthetized by intraperitoneal injection of 50 mg./kg. of sodium pentylbarbital, whereupon cardiovascular reflexes are blocked by subcutaneous injection of 3 mg. of atropine sulfate dissolved in 0.3 ml. of aqueous 0.85% sodium chloride and sensitization is induced by subcutaneous injection of 5 mg. of pentolinium tartrate dissolved in 1 ml. of aqueous 0.85% sodium chloride. The trachea is intubated and both femoral veins and femoral artery are cannulated, the latter being connected to a calibrated transducer, amplifier and recorder. After surgery, 5 mg./kg. of heparin sodium is introduced via one of the venous cannulae as a 2% solution in aqueous 0.85% sodium chloride and rectal temperature is adjusted to 32° C. by means of a regulator and external heat source. When the animal's blood pressure and temperature have stabilized, five consecutive 0.1 ml. doses of angiotensin spaced 3 minutes apart are administered via one of the venous cannulae, followed immediately by a dose of the test compound dissolved or suspended in water q.s. a concentration of 10 mg./ml. and administered via the other venous cannula. After 15 minutes, the angiotensin dosage is repeated, whereupon the mean response to the pre-compound treatment with angiotensin is determined and compared with the mean response to the post-compound angiotensin treatment. The compound is considered hypotensive if it significantly ($P \leq 0.05$) decreases the mean response to angiotensin in more than half of the test animals.

The instant compounds are useful also as intermediates in the manufacture of novel prostanoic acid derivatives of the following structural formula

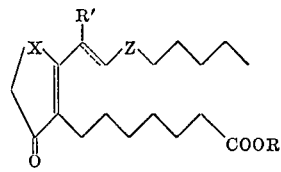

wherein R is hydrogen or a lower alkyl radical, as defined hereinbefore, R' is hydrogen or a hydroxy group, X is a hydroxymethylene or lower(alkanoyl)oxy methylene radical, Z is a carbonyl or hydroxymethylene group and the dotted line indicates an optional 13, 14 double bond. The lower alkanoyl radicals are as defined hereinbefore.

A specific example of the manufacture of one of the latter compounds is the reaction of methyl 3-acetoxy-2-formyl-5-oxocyclopent - 1 - eneheptanoate, manufactured from a compound of this invention, with hexanoylmethylene triphenyl phosphorane to afford methyl 11-acetoxy-9,15-dioxo-prosta-8(12),13-dienoate. These prostanoic acid derivatives display valuable pharmacological properties. They are thus hypotensive, smooth muscle-contracting, anti-bacterial, anti-protozoal, anti-fungal and pepsin-inhibitory agents.

The following examples describe in detail compounds illustrative of the present invention and methods which have been devised for their manufacture. The invention, however, is not to be construed as limited thereby either in spirit or in scope since it will be apparent to those skilled in the art that many modifications both of materials and of methods may be practiced without departing from the purpose and intent of this disclosure. Throughout these examples temperatures are given in degrees centigrade and relative amounts of materials in parts by weight except as otherwise noted.

EXAMPLE 1

A solution containing 100 parts of 4-phenyl-3-buten-2-one, 106 parts of selenous acid, 160 parts of dioxane and 20 parts of water is heated to the reflux temperature. After the initial vigorous reaction has subsided, the mixture is heated at that temperature for an additional 30 minutes. The supernatant is then decanted from the metallic selenium and is concentrated under reduced pressure. Distillation of the residue under reduced pressure affords, as a yellow oil, styrylgyoxal, boiling at about 120° at 2.5 mm. pressure.

EXAMPLE 2

A solution of 38.2 parts of dimethyl 3-oxo-undecane-1,11-dioate in 200 parts by volume of 10% aqueous potassium hydroxide is stored at 0–5° for about 3 days, then is adjusted to pH 5 by the addition of concentrated aqueous citric acid. To that mixture is added a solution which is prepared by heating 21.9 parts of styrylglyoxal in 50 parts by volume of 50% aqueous methanol at 65–75° for about 20 minutes, then adding 60 parts of methanol. To the resulting reaction mixture is added 30 parts by volume of 1 M pH 4.5–5.0 citrate buffer and stirring at room temperature is continued for about 3 hours, during which time carbon dioxide gas is evolved. The precipitated product is collected by filtration, thus affording the half potassium salt of 14-phenyl-9,12-dioxo-11-hydroxytetradec-13-enoic acid, melting at about 105°. Further purification by recrystallization from methanol affords the pure compound, melting at about 107.5°.

The latter half potassium salt is dissolved in water and the resulting aqueous solution is acidified by the addition of dilute hydrochloric acid. The resulting acidic mixture is extracted with ether and the ether layer is separated, washed with water, dried over anhydrous sodium sulfate and concentrated to dryness. The resulting solid residue is purified by recrystallization from chloroform-ether to yield 14-phenyl-9,12-dioxo - 11 - hydroxytetradec - 13-enoic acid, melting at about 81.5–83°. This compound is represented by the following structural formula

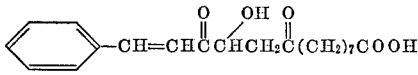

EXAMPLE 3

To 3000 parts by volume of an aqueous solution containing 6.7 parts of potassium hydroxide is added, with stirring at 21–23° over a period of about 2¼ hours, a solution of 10.4 parts of 14 - phenyl-9,12-dioxo-11-hydroxytetradec-13-enoic acid in 187 parts of chloroform. After completion of the addition, the reaction mixture is stirred for an additional 2 hours, and then is made acidic by adding 10 parts of oxalic acid dihydrate. The acidic mixture is extracted with chloroform and the organic layer is washed with dilute aqueous sodium chloride, then dried over anhydrous sodium sulfate and concentrated to dryness under reduced pressure. The resulting residue is recrystallized first from benzene, then from chloroform-ether to yield 3-hydroxy-5-oxo-2-styrylcyclopent-1-eneheptanoic acid, which displays a melting point at about 118°. This compound displays an ultraviolet absorption maximum at about 325 millimicrons with a molecular extinction coefficient of about 36,400.

EXAMPLE 4

A mixture containing 44.3 parts of 3-hydroxy-5-oxo-2-styrylcyclopent-1-eneheptanoic acid, 11.3 parts of diazomethane and 700 parts of ether is kept at room temperature for about 5 minutes, at the end of which time acetic acid is added in order to destroy the excess reagent. The resulting mixture is then washed with aqueous sodium bicarbonate, dried over anhydrous sodium sulfate and stripped of solvent by distillation under reduced pressure. The residue is purified by chromatography, first on silica gel followed by elution with 50% ethyl acetate in benzene, then by dry chromatography on silica gel containing 8% water, also using 50% ethyl acetate in benzene, thus affording methyl 3-hydroxy-5-oxo-2-styrylcyclopent-1-eneheptanoate. This compound is characterized by infrared absorption maxima, in chloroform, at about 2.75, 2.87, 5.76, 5.88 and 6.17 microns and by an ultraviolet absorption maximum at about 325 millimicrons with a molecular extinction coefficient of about 36,000.

EXAMPLE 5

A solution containing 0.9 part of methyl 3-hydroxy-5-oxo-2-styrylcyclopent-1-eneheptanoate, 10 parts of pyridine and 2 parts of acetic anhydride is kept at room temperature for about 16 hours, then is poured slowly into water. The resulting aqueous mixture is extracted with ether and the ether layer is separated, washed successively with dilute aqueous sodium bicarbonate and dilute aqueous sodium chloride, then dried over anhydrous sodium sulfate and concentrated to dryness under reduced pressure. The resulting residue is purified either by preparative thin layer chromatography using 20% ethyl acetate in benzene on silica gel or by dry chromatography on silica gel containing 8% water, also using 20% ethyl acetate in benzene. The resulting product, obtained as an oil, is methyl 3 - acetoxy-5-oxo-2-styrylcyclopent-1-eneheptanoate. In chloroform, this compound exhibits infrared absorption maxima at about 5.75, 5.86, 6.15 and 8.02 microns. It exhibits also an ultraviolet absorption maximum at about 325 millimicrons with a molecular extinction coefficient of about 32,700.

EXAMPLE 6

To a solution of 1.23 parts of methyl 3-acetoxy-5-oxo-2-styrylcyclopent-1-eneheptanoate in 20 parts of dioxane is added a solution of 0.81 part of osmium tetroxide in 3.85 parts of dioxane. The resulting reaction mixture is allowed to stand at room temperature for about 70 hours, at the end of which time the excess reagent is decomposed by the addition of hydrogen sulfide. The resulting solution is filtered through silica gel containing 8% of water and the adsorbent is washed with an ethyl acetate-methanol solution. The filtrate is concentrated and purified by dry column chromatography on silica gel containing 8% of water, using 50% ethyl acetate in benzene, thus affording, as an oil, methyl 3 - acetoxy-5-oxo-2-($\alpha,\beta$-dihydroxyphenethyl)cyclopent-1-eneheptanoate. This compound exhibits infrared absorption maxima, in chloroform, at about 2.78 and 5.78 microns and also an ultraviolet absorption maximum at about 234 millimicrons with a molecular extinction coefficient of about 10,900.

EXAMPLE 7

To a solution of 0.2 part of methyl 3-acetoxy-5-oxo-2-($\alpha,\beta$-dihydroxyphenethyl)cyclopent-1-eneheptanoate in 8 parts of ethanol is added a solution of 0.12 part of sodium periodate in 2 parts of water. The resulting reaction mixture is allowed to stand at room temperature for about 45 minutes, then is diluted with water and extracted with ether. The ether layer is separated, washed with water, dried over anhydrous sodium sulfate and concentrated to dryness under reduced pressure. The resulting residue is heated under reduced pressure for about 10 minutes in order to removed benzaldehyde, thus affording the oily product, which is methyl 3-acetoxy-2-formyl-5-oxocyclopent-1-eneheptanoate. It displays infrared adsorption maxima, in chloroform, at about 5.78 and 5.92 microns.

EXAMPLE 8

To a suspension of 214 parts of triphenyl methyl phosphonium bromide with 1400 parts of ether, under nitrogen, is added, at 0–5°, 190 parts by volume of a hexane solution containing 41.9 parts of n-butyl lithium. The resulting reaction mixture is allowed to warm to room temperature, then is stirred for about 1 hour and cooled to 0–5°. A solution of 100 parts of n-hexanoyl chloride in 700 parts of ether is added under nitrogen and the resulting mixture is kept at room temperature for about 16 hours. At the end of that reaction period the ether solution is decanted and washed with dilute hydrobromic acid. The acidic washing is then shaken with the precipitate and the resulting solution is extracted with chloroform. The chloroform extract is washed successively with hydrobromic acid and water, dried over anhydrous sodium sulfate, concentrated to a small volume and diluted with hexane. The resulting crystals of starting material are removed by filtration and the filtrate is dissolved in chloroform, then washed successively with 20% aqueous potassium hydroxide, water, hydrobromic acid and water, dried over anhydrous sodium sulfate and concentrated to a small volume under reduced pressure. Dilution of the resulting solution with cyclohexane results in precipitation of the crystalline product, which is purified by recrystallization from aqueous ethanol to afford transparent needle-like crystals of triphenyl 2-oxoheptyl phosphonium bromide, melting at about 195°.

EXAMPLE 9

A solution of 0.19 part of triphenyl 2-oxoheptyl phosphonium bromide in 75 parts of chloroform is shaken with dilute aqueous potassium hydroxide, then washed with dilute aqueous sodium chloride, dried over anhydrous sodium sulfate, concentrated and dried at room temperature under reduced pressure. The resulting residue consisting of 0.16 part of hexanoylmethylene triphenyl phosphorane is combined with 0.13 part of methyl 3-acetoxy-2-formyl-5-oxocyclopent-1-eneheptanoate and dissolved in 13.2 parts of benzene. The resulting reaction mixture is heated at the reflux temperature for about 24 hours, then is cooled and stripped of solvent under reduced pressure. The resulting residue is purified by dry column chromatography on silica gel containing 8% of water, using 20% ethyl acetate in benzene, to afford methyl 11 - acetoxy-9,15-dioxoprosta-8(12),13-dienoate. This compound exhibits infrared absorption maxima, in chloroform, at about 5.78 and 6.28 microns and an ultraviolet absorption maximum at about 288.5 millimicrons with a molecular extinction coefficient of about 31,300.

EXAMPLE 10

A mixture consisting of 13 parts of 3-hydroxy-5-oxo-2-styrylcyclopent-1-eneheptanoic acid, 17.8 parts of sodium periodate, 55 parts of water, 160 parts of dioxane and 2 parts of 2% osmium tetroxide in dioxane solution is stirred under nitrogen at room temperature for about 4 hours. That reaction mixture is then extracted with ether and the ether layer is separated and extracted several times with 0.5% aqueous sodium chloride. The salt extracts are saturated with sodium chloride, then extracted with ether. The ether layer is separated, dried over anhydrous soduim sulfate, concentrated and dried under reduced pressure to afford 2-formyl-3-hydroxy-5-oxocyclopent-1-eneheptanoic acid, characterized by an ultraviolet absorption maximum at about 228 millimicrons with a molecular extinction coefficient of about 10,100.

EXAMPLE 11

To a solution of 10.2 parts of 2-formyl-3-hydroxy-5-oxocyclopent-1-eneheptanoic acid in 200 parts of dioxane is added 4 parts of triethylamine and the resulting mixture is stripped of excess triethylamine by distillation under reduced pressure. The resulting residue is dissolved in 210 parts of dioxane. To that dioxane solution is then added 15.3 parts of hexanoylmethylene triphenyl phosphorane, dissolved in 396 parts of benzene. The resulting reaction mixture is heated at the reflux temperature under nitrogen for about 18 hours, then is cooled, washed with aqueous oxalic acid and extracted with aqueous potassium bicarbonate. That alkaline extract is washed with ether, then acidified with oxalic acid and extracted with ether. The ether extract is washed with aqueous sodium chloride, dried over anhydrous sodium sulfate and concentrated to dryness under reduced pressure to afford the crude product, which is purified by dry column chromatography on silica gel containing 8% of water, using 4% methanol in benzene or by chromatography on silica gel and elution with 40% ethyl acetate in benzene, thus affording 11-hydroxy-9,15-dioxoprosta-8(12),13-dienoic acid, characterized by an ultraviolet absorption maximum at about 291 millimicrons with a molecular extinction coefficient of about 21,900.

EXAMPLE 12

To a solution of 0.25 part of lithium metal in 70 parts of liquid ammonia is added a solution of 1 part of 11-hydroxy-9,15-dioxoprosta-8(12),13-dienoic acid in 18 parts of tetrahydrofuran. The reaction mixture is stirred for about 10 minutes, at the end of which time 5 parts of solid ammonium chloride is added rapidly. The ammonia is evaporated under a stream of nitrogen and the resulting residue is cooled to 0–5°, then diluted with ether. To the resulting suspension is added excess cold aqueous citric acid until the mixture is distinctly acidic. The resulting layers are separated and the aqueous layer is extracted with ether. The combined ether solutions are washed several times with aqueous sodium chloride, then dried over anhydrous sodium sulfate and concentrated to dryness under nitrogen to afford an orange oily residue. That oil is dissolved in a 25% ethyl acetate in benzene solution and purified by dry column chromatography on silica gel containing 8% of water and 2% of glacial acetic acid, using ethyl acetate as the solvent, to afford a fraction which is 11-hydroxy-9,15-dioxoprost-8(12)-enoic acid, characterized by an ultraviolet absorption maximum at about 233 millimicrons with a molecular extinction coefficient of about 13,900.

EXAMPLE 13

To a solution of 12 parts of 11-hydroxy-9,15-dioxoprosta-8(12),13-dienoic acid in 28 parts of ethanol, cooled to 0–5°, is added dropwise a solution of 3 parts of triethylamine in 275 parts of water. To that mixture is added dropwise with cooling and stirring a solution of 0.32 part of sodium borohydride in 32 parts of water. Stirring at approximately 10° is continued for about 25 minutes, at the end of which time the reaction mixture is poured carefully into excess aqueous citric acid. Extraction with ether affords an organic solution, which is washed with water, dried over anhydrous sodium sulfate and concentrated under reduced pressure to afford 11,15-dihydroxy-9-oxoprosta-8(12),13-dienoic acid. This mixture of epimeric 11-hydroxy compounds is separated by chromatography on silica gel. Elution with 30% ethyl acetate in chloroform affords epimer A, characterized by an ultraviolet absorption maximum at about 277 millimicrons with a molecular extinction coefficient of about 24,400. Further elution of the column with 50% ethyl acetate in chloroform yields epimer B, characterized by an ultraviolet absorption maximum at about 277.5 millimicrons with a molecular extinction coefficient of about 23,400.

EXAMPLE 14

A mixture of 13.5 parts of methyl 3-hydroxy-5-oxo-2-styrylcyclopent-1-eneheptanoate, 17.8 parts of sodium periodate, 55 parts of water, 160 parts of dioxane and 2 parts by volume of a 2% osmium tetroxide in dioxane solution is stirred at room temperature under nitrogen for about 4 hours. The reaction mixture is extracted with ether and the ether solution is dried over anhydrous sodium sulfate, then concentrated to dryness under reduced pressure. The resulting residue is purified by dry column chromatography on silica gel containing 8% of water, using 50% ethyl acetate in benzene, thus affording methyl 2-formyl-3-hydroxy - 5 - oxocyclopent-1-eneheptanoate, characterized by an ultraviolet absorption maximum at about 228 millimicrons with a molecular extinction coefficient of about 10,200.

EXAMPLE 15

To a solution of 3.4 parts of methyl 3-hydroxy-5-oxo-2-styrylcyclopent-1-eneheptanoate in 40 parts of dioxane is added successively 1.3 parts by volume of a 2% osmium tetroxide in dioxane solution and a solution of 4.28 parts of sodium periodate in 14 parts of water. The resulting reaction mixture is stirred at room temperature for about 3 hours, then is extracted with ether and the ether extract is poured through a column of anhydrous sodium sulfate, then concentrated to dryness under reduced pressure. The latter residue together with hexanoylmethylene triphenyl phosphorane, prepared from 4.1 parts of triphenyl methyl phosphonium chloride by the procedure described in Example 9, is dissolved in 200 parts of benzene and that reaction mixture is heated at the reflux temperature under nitrogen for about 20 hours. The solvent is removed by distillation under reduced pressure and the residual material is purified by dry column chromatography on silica gel containing 8% of water, using 50% ethyl acetate in benzene, thus affording methyl 11-hydroxy-9,15-dioxoprosta-8(12),13-dienoate, which compound exhibits an ultraviolet absorption maximum at about 291.5 millimicrons with a molecular extinction coefficient of about 24,600.

EXAMPLE 16

To a solution of 6.8 parts of methyl 3-hydroxy-5-oxo-2-styrylcyclopent-1-eneheptanoate and 2 parts of pyridine in 80 parts of dioxane is added, at 0–5°, a solution of 2.4 parts of chloroacetyl chloride in 20 parts of dioxane. The resulting reaction mixture is stirred at that temperature for about 30 minutes, then at room temperature for about 5 hours. At the end of that reaction period the mixture is poured carefully into ice water and the resulting aqueous mixture is extracted with ether. The ether solution is washed successively with dilute hydrochloric acid and dilute aqueous sodium bicarbonate, then dried over anhydrous sodium sulfate and stripped of solvent under reduced pressure. The resulting product is purified by dry column chromatography on silica gel containing 8% of water, using 18% ethyl acetate in benzene, to afford pure methyl 3-chloroacetoxy - 5 - oxo-2-styrylcyclopent-1-eneheptanoate.

EXAMPLE 17

To a suspension of 1.3 parts of chromium trioxide with 15 parts of pyridine is added a solution of 1.5 parts of methyl 3 - hydroxy-5-oxo-2-styrylcyclopent-1-eneheptanoate in 8 parts of pyridine and the resulting reaction mixture is stirred at room temperature for about 1 hour, then is allowed to stand at that temperature for about 16 hours. To the reaction mixture ice water is then added carefully and the resulting aqueous mixture is extracted with methylene chloride. The organic extract is washed successively with dilute hydrochloric acid and dilute aqueous sodium chloride, then dried over anhydrous sodium sulfate and stripped of solvent under reduced pressure. The resulting residue is purified by dry column chromatography on silica gel containing 8% of water followed by extraction of the column with 18% ethyl acetate in benzene. The resulting crystalline product is purified further by recrystallization from benzene-cyclohexane to afford methyl 3, 5-dioxo - 2 - styrylcyclopent-1-eneheptanoate, obtained as yellow needle-like crystals melting at about 62.5°. This compound displays ultraviolet absorption maxima at about 340.5 and 250.5 millimicrons with molecular extinction coefficients of 24,000 and 10,500, respectively.

EXAMPLE 18

A mixture containing 1.7 parts of methyl 3,5-dioxo-2-styrylcyclopent - 1 - eneheptanoate, 1.44 parts of osmium tetroxide and 30 parts of dioxane is allowed to stand at room temperature for about 6 days. The reaction mixture which has solidified during that period is diluted with dioxane and hydrogen sulfide gas is bubbled into the resulting suspension. The inorganic insolubles are removed by filtration and the filtrate is concentrated to dryness under reduced pressure. Purification of the resulting residue by dry column chromatography, using a silica gel column containing 8% of water and 50% ethyl acetate in benzene as the solvent, affords methyl 3,5-dioxo-2-($\alpha,\beta$-dihydroxyphenethyl)cyclopent - 1 - eneheptanoate, which displays an ultraviolet absorption maximum at about 247.5 millimicrons with a molecular extinction coefficient of about 10,750.

EXAMPLE 19

To a cold solution of 0.8 part of potassium hydroxide in 10 parts of water is added 2 parts of ethyl 3-oxooctanoate and that mixture is stirred at 0–5° until homogeneous. The homogeneous mixture is kept at 0–5° for about 72 hours, then is neutralized to pH 7 by the addition of concentrated aqueous citric acid. To that mixture is then added successively 2.5 parts by volume of 1 M citrate buffer of pH 4.8 and a solution of 2.5 parts of 2-formyl-3-hydroxy-5-oxocyclopent-1-eneheptanoic acid in 4.8 parts of methanol containing 2.5 parts of water. The pH is adjusted to 4.5–5.0 and the mixture is stirred for approximately 3 hours at about 35°, then is allowed to stand at room temperature for about 16 hours. The reaction mixture is extracted with ether and the ether layer is separated, dried over anhydrous sodium sulfate and stripped of solvent under reduced pressure to afford, as a pale yellow glass, 11,13-dihydroxy-9,15-dioxoprost-8(12)-enoic acid, which compound displays an ultraviolet absorption maximum at about 233 millimicrons with a molecular extinction coefficient of about 11,500.

EXAMPLE 20

A solution of 8.27 parts of 2-formyl-3-hydroxy-5-oxocyclopent-1-eneheptanoic acid in 150 parts by volume of 50% aqueous acetic acid is stirred at 0–5° with 15 parts of zinc powder for about 2 hours. At the end of that time the mixture is filtered and the filtrate is diluted with approximately 200 parts by volume of saturated aqueous sodium chloride. Extraction of that mixture with ether affords an organic solution, which is washed with saturated aqueous sodium chloride, then dried over anhydrous sodium sulfate and stripped of solvent under reduced pressure. The resulting residue is combined with n-hexanoylmethylene triphenyl phosphorane, prepared from 27.2 parts of n-hexanolymethyl triphenyl phosphonium chloride according to the procedure of Example 9, then is dissolved in a mixture of 100 parts of dioxane and 440 parts of benzene. The resulting mixture is heated under nitrogen at the reflux temperature for about 5½ hours, then is concentrated to dryness under reduced pressure. The resulting residue is extracted with ether and the ether extract is washed with cold hydrochloric acid, then with cold water and is finally extracted with cold aqueous potassium bicarbonate. The alkaline extract is acidified by the addition of citric acid and that acidic mixture is extracted with ether. The ether solution is washed with water, dried over anhydrous sodium sulfate and concentrated to dryness under reduced pressure to afford a mixture of 11α-hydroxy-9,15-dioxoprost-13-enoic acid and 11β-hydroxy-9,15-dioxoprost-13-enoic acid. Separation of those epimers is achieved by partition chromatography on silica gel, wherein the solvents are prepared by shaking together 500 parts by volume of hexane, 1000 parts by volume of benzene, 500 parts by volume of methanol and 200 parts of water. The lower layer is used as the stationary phase and the upper layer as the eluant. Elution of the column affords 11β-hydroxy-9,15-dioxoprost-13-enoic acid, characterized by an ultraviolet absorption maximum at about 228.5 millimicrons with a molecular extinction coefficient of about 11,400, followed by 11α-hydroxy-9,15-dioxoprost-13-enoic acid, which exhibits an ultraviolet absorption maximum at about 228.5 millimicrons with a molecular extinction coefficient of about 10,700.

What is claimed is:
1. A compound of the formula

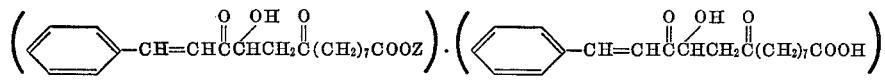

wherein Z is selected from the group consisting of hydrogen and potassium with the provision that when Z is hydrogen, $n$ is equal to 0 and when Z is potassium, $n$ is equal to 1.

2. As in claim 1, the compound which is 14-phenyl-9, 12-dioxo-11-hydroxytetradec-13-enoic acid.

3. As in claim 1, the compound which is the half potassium salt of 14-phenyl-9,12-dioxo-11-hydroxytetradec-13-enoic acid.

References Cited

Miyano et al.: Tetrahedron Letters, No. 20, pp. 1615–1618, 1969.

CA:17884f(a), vol. 63, 1965.

LEWIS GOTTS, Primary Examiner

E. G. LOVE, Assistant Examiner

U.S. Cl. X.R.

260—468 R, 469, 473 A, 487, 488 R, 488 D, 514 R, 515 R, 520, 590; 424—305, 308, 317

UNITED STATES PATENT OFFICE
CERTIFICATE OF CORRECTION

Patent No. 3,732,267                    Dated May 8, 1973

Inventor(s) Masateru Miyano

It is certified that error appears in the above-identified patent and that said Letters Patent are hereby corrected as shown below:

Column 1, lines 27-28, "The instant compounds of the following structural formula" should be -- The instant compounds are useful as intermediates in the production of compounds of the following structural formula --.

Column 7, line 20, "soduim" should be -- sodium --.

Column 10, first formula,

" COOH) " should be -- COOH)$_n$ --.

Signed and sealed this 16th day of April 1974.

(SEAL)
Attest:

EDWARD M.FLETCHER,JR.
Attesting Officer

C. MARSHALL DANN
Commissioner of Patents